(12) United States Patent
Yan et al.

(10) Patent No.: US 10,936,502 B2
(45) Date of Patent: Mar. 2, 2021

(54) SHADOW ADDRESS SPACE FOR SHARING STORAGE

(71) Applicants: EMC IP Holding Company LLC, Hopkinton, MA (US); Bob Yan, Chengdu (CN); Helen Yan, Nanjing (CN)

(72) Inventors: Bob Yan, Chengdu (CN); Helen Yan, Nanjing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/764,855

(22) PCT Filed: Oct. 31, 2017

(86) PCT No.: PCT/CN2017/108627
§ 371 (c)(1),
(2) Date: Mar. 29, 2018

(87) PCT Pub. No.: WO2019/084782
PCT Pub. Date: May 9, 2019

(65) Prior Publication Data
US 2019/0129860 A1    May 2, 2019

(51) Int. Cl.
*G06F 12/10* (2016.01)
(52) U.S. Cl.
CPC ...... *G06F 12/10* (2013.01); *G06F 2212/1044* (2013.01)
(58) Field of Classification Search
None
See application file for complete search history.

(56) References Cited

U.S. PATENT DOCUMENTS

| 9,575,894 | B1 | 2/2017 | Natanzon et al. |
| 9,661,007 | B2 | 5/2017 | Gasparakis et al. |
| 2010/0312972 | A1* | 12/2010 | Gao ...................... G06F 9/3004 |
| | | | 711/152 |

(Continued)

FOREIGN PATENT DOCUMENTS

| CN | 103999105 A | 8/2014 |
| CN | 105991651 A | 10/2016 |
| CN | 107018185 A | 8/2017 |

OTHER PUBLICATIONS

International Search Report and Written Opinion issued in corresponding Application No. PCT/CN2017/108627, dated Jul. 25, 2018 (9 pages).

*Primary Examiner* — Charles Rones
*Assistant Examiner* — Ryan Dare
(74) *Attorney, Agent, or Firm* — Chamberlain, Hrdlicka, White, Williams & Aughtry

(57) ABSTRACT

A computing device includes a persistent storage and a processor. The processor includes a local storage. The local storage includes blocks and an address space. The address space includes a first portion of entries that specify blocks of the local storage and a second portion of entries that specify blocks of the remote data storage. The processor obtains data for storage and makes a determination that the data cannot be stored in the local storage. In response to the determination, the processor stores the data in the remote storage using the second portion of entries.

15 Claims, 13 Drawing Sheets

(56) References Cited

U.S. PATENT DOCUMENTS

| | | | |
|---|---|---|---|
| 2011/0191556 A1* | 8/2011 | Anderson | G06F 3/0685 |
| | | | 711/162 |
| 2013/0036272 A1* | 2/2013 | Nelson | H04L 67/1097 |
| | | | 711/147 |
| 2013/0212144 A1 | 8/2013 | Faitelson et al. | |
| 2016/0192178 A1* | 6/2016 | Blong | G06F 3/067 |
| | | | 455/418 |
| 2017/0280102 A1* | 9/2017 | Burke | H04N 1/2183 |
| 2018/0285015 A1 | 10/2018 | Ruan et al. | |

* cited by examiner

SHADOW ADDRESS SPACE FOR SHARING STORAGE

BACKGROUND

Computing devices generate, use, and store data. The data may be, for example, images, documents, webpages, or meta-data associated with the data. The data may be stored on a persistent storage.

Computing devices may not have sufficient capacity to store all of the data generated by the devices. Additional storage capacity may be needed to store the generated data.

SUMMARY

In one aspect, a computing device in accordance with one or more embodiments of the invention includes a persistent storage and a processor. The processor includes a local storage. The local storage includes blocks and an address space. The address space includes a first portion of entries that specify blocks of the local storage and a second portion of entries that specify blocks of the remote data storage. The processor obtains data for storage and makes a determination that the data cannot be stored in the local storage. In response to the determination, the processor stores the data in the remote storage using the second portion of entries.

In one aspect, an entry of the second portion of entries in accordance with one or more embodiments of the invention includes a computing device identifier that identifies a second computing device that hosts the remote data storage and a logical address identifier that specifies an entry of an address space of the second computing device.

In one aspect, each entry of the second portion of entries in accordance with one or more embodiments of the invention does not specify a block of the remote data storage.

In one aspect, the entry of the address space of the second computing device in accordance with one or more embodiments of the invention specifies a block of the blocks of the remote storage.

In one aspect, an entry of the second portion of entries in accordance with one or more embodiments of the invention includes a use state and/or a block status.

In one aspect, storing the data in the remote storage using the second portion of entries in accordance with one or more embodiments of the invention includes allocating a block of the remote storage indicated by the entry of the second portion of entries; locking the allocated block by updating the use state of the entry of the second portion of entries to locked; writing a portion of the data to the locked allocated block; and unlocking the locked allocated block after writing the portion of the data by updating the use state of the entry of the second portion of entries to unlocked.

In one aspect, the block state in accordance with one or more embodiments of the invention specifies a state of the remote storage hosting a block specified by the entry of the second portion of entries is available.

In one aspect, the use state in accordance with one or more embodiments of the invention specifies whether a block specified by the entry of the second portion of entries is available.

In one aspect, the processor in accordance with one or more embodiments of the invention obtains second data for storage; makes a second determination that the second data can be stored in the local storage; and in response to the second determination, stores the second data in the local storage using the first portion of entries.

In one aspect, each entry of the first portion of entries in accordance with one or more embodiments of the invention specifies a block identifier associated with a respective block of the blocks of the local storage.

In one aspect, the processor in accordance with one or more embodiments of the invention identifies a change in the availability of the local storage; in response to the identified change, identifies a block of the blocks of the remote storage storing a portion of a file; and migrates the identified block of the blocks of the remote storage to the local storage.

In one aspect, migrating the identified block of the blocks of the remote storage to the local storage in accordance with one or more embodiments of the invention includes making a copy of identified block of the blocks of the remote storage in a block of the blocks of the local storage; deleting the identified block of the blocks of the remote storage; and updating the address space based on the copy and the deletion.

In one aspect, updating the address space based on the copy and the deletion in accordance with one or more embodiments of the invention includes deleting a computing device identifier and a logical address identifier associated with a second entry of the second portion of entries that indicates the identified block of the blocks of the remote storage; and adding a block identifier that specifies the block of the blocks of the local storage.

In one aspect, a method of operating a computing device in accordance with one or more embodiments of the invention includes obtaining, by the computing device, data for storage. The method further includes making, by the computing device, a determination that the data cannot be stored in a local storage comprising blocks. The blocks of the local storage are specified by a first portion of entries of an address space of the computing device. The method additionally includes in response to the determination, storing, by the computing device, the data in a remote storage using a second portion of entries that indicate blocks of the remote storage.

In one aspect, the method of operating a computing device in accordance with one or more embodiments of the invention also includes obtaining, by the computing device, second data for storage; making a second determination, by the computing device, that the second data can be stored in the local storage; and in response to the second determination, storing, by the second computing device, the second data in the local storage using the first portion of entries.

In one aspect, the method of operating a computing device in accordance with one or more embodiments of the invention also includes identifying, by the computing device, a change in the availability of the local storage; in response to the identified change, identifying, by the computing device, a block of the blocks of the remote storage storing a portion of a file; and migrating, by the computing device, the identified block of the blocks of the remote storage to the local storage.

In one aspect, a non-transitory computer readable medium in accordance with one or more embodiments of the invention includes instructions which when executed by a computer processor enables the computer processor to perform a method for operating a computing device, the method includes obtaining, by the computing device, data for storage. The method further includes making, by the computing device, a determination that the data cannot be stored in a local storage comprising blocks. The blocks of the local storage are specified by a first portion of entries of an address space of the computing device. The method additionally includes in response to the determination, storing, by the computing device, the data in a remote storage using a second portion of entries that indicate blocks of the remote storage.

In one aspect, the non-transitory computer readable medium in accordance with one or more embodiments of the invention includes instructions which when executed by a computer processor enables the computer processor to perform a method for operating a computing device, the method further includes obtaining, by the computing device, second data for storage; making a second determination, by the computing device, that the second data can be stored in the local storage; and in response to the second determination, storing, by the second computing device, the second data in the local storage using the first portion of entries.

In one aspect, the non-transitory computer readable medium in accordance with one or more embodiments of the invention includes instructions which when executed by a computer processor enables the computer processor to perform a method for operating a computing device, the method further includes identifying, by the computing device, a change in the availability of the local storage; in response to the identified change, identifying, by the computing device, a block of the blocks of the remote storage storing a portion of a file; and migrating, by the computing device, the identified block of the blocks of the remote storage to the local storage.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
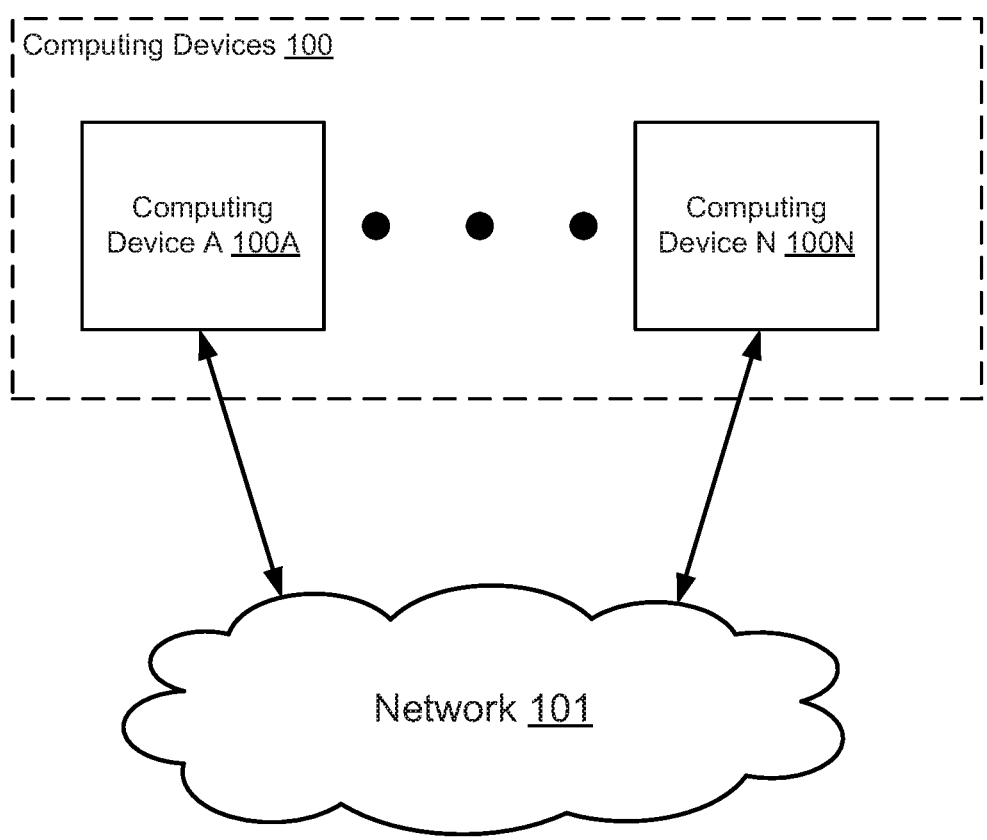
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing data. More specifically, the systems, devices, and methods may manage data by sharing storage space among multiple computing devices. Each of the computing devices may dedicate a portion of the capacity of their storage resource, e.g., hard disk drives, solid state drives, etc., to a shared pool. The shared pool may be accessed by any of the computing devices. Thus, if a computing device does not have sufficient local storage to store data, the computing device may store the data in the shared pool.

To facilitate accessing the shared pool, each computing device may have an address space that includes entries that specify blocks hosted by local storage and other entries that indicate blocks hosted by remote storage. The blocks specified by entries of the address space that are hosted by remote storage may also include availability information regarding the blocks. The availability information may be used by the computing devices to manage sharing of the shared pool. In other words, to prevent multiple computing devices from attempting to store data using the same portion of the shared pool.

In one or more embodiments of the invention, each computing device may dynamically adjust the storage location of data, e.g., in a local storage or in a remote storage via the shared pool. Storing or retrieving data in the shared pool may incur more computing resource overhead when compared to storing data in a local storage. Each computing device may attempt to reduce computational resource overhead by moving data stored in the shared pool to a local storage.

As used herein, computing resources refer to processor computing cycles, communication bandwidth, transitory storage input-output cycles, persistent storage input-output cycles, storage latency, and/or transitory or persistent memory storage capacity. Transitory storage may be provided by, for example, random access memory. Persistent storage memory may be provided by, for example, a solid state hard disk drive. Processor computing cycles may be provided by, for example, a central processing unit. Communication bandwidth may be provided by, for example, a network interface card.

FIG. 1A shows a system in accordance with one or more embodiments of the invention. The system may include computing devices (100) that store in local storages of each computing device and in a shared pool. The shared pool may include storage capacity hosted by one or more of the computing devices (100A, 100N). Each of the computing devices (100) may be operably connected to each other via a network (101). Each component of the system is discussed below.

Figure 1B:
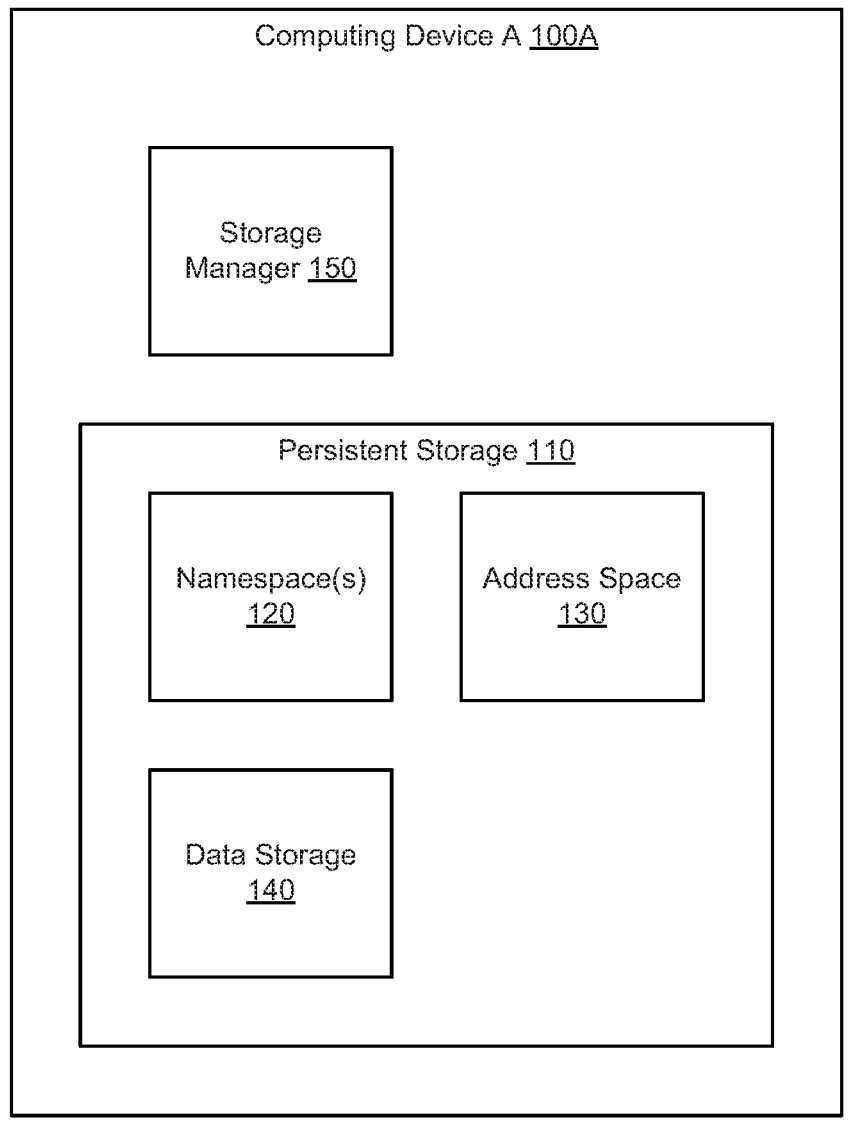
FIG. 1B shows a diagram of a computing device in accordance with one or more embodiments of the invention.

The computing devices (100) may be physical devices or virtual devices. The computing devices (100) may be, for example, mobile phones, tablet computers, laptop computers, desktop computers, servers, cloud resources, or a virtual device utilizing a portion of the computing resources of a computing device. The computing devices (100) may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and the methods shown in FIGS. 3A-5. The computing devices (100) may be other types of computing devices without departing from the invention. For additional details regarding the computing devices (100), See FIG. 1B.

The network (101) may be a computer network. The network may facilitate communications between the computing devices (100). The communications between the computing devices (100) may include data stored/retrieved from a shared pool. The network (101) may include any number of wired or wireless links between the computing devices (100). In one or more embodiments of the invention, the network (101) may be a high performance computing (HPC) network.

FIG. 1A shows a diagram of a computing device A (100A) in accordance with one or more embodiments of the invention. As discussed above with respect to FIG. 1A, the computing device A (100A) may store data in a local storage, i.e., a storage hosted by one or more persistent storages of computing device A (100A), or a remote storage, i.e., a storage hosted by one or more persistent storages of one or more other computing devices. To facilitate this functionality, the computing device A (100A) may include a persistent storage (110) that hosts a data storage (140) for storing data and a storage manager (150) may manages storing/stored data. Each component of the computing device A (100A) is discussed below.

The persistent storage (110) may be one or more physical storage devices. The physical devices may be, for example, hard disk drives, solid state drives, tape drives, or any other type of persistent computer readable storage medium. Each of the physical storage devices may be capable of storing data.

The persistent storage (110) may host a data storage (140) for storing data, namespace(s) that organize data stored in the data storage (140), and an address space (130) that organizes the storage resources of the persistent storage (110). Each component hosted by the persistent storage (110) is discussed below.

The address space (130) maybe a data structure that organizes the storage capacity of the persistent storage (110) and a portion of the storage capacity of persistent storages of other computing devices. The address space (130) may divide the storage capacity of the persistent storage (110) and a portion of the storage capacity of persistent storages of other computing devices into addressable blocks. Each block my include a predetermined number of bits and may be uniquely identified using a block identifier. The address space (130) may include entries corresponding to each of the blocks. Each entry may include information that enables the computing device (100A) to access the corresponding block. For additional details regarding the address space, See FIG. 1D.

The namespace(s) (120) may organize data stored in the data storage (140). The namespace(s) (120) may associate one or more blocks of the address space (130) with a unique identifier such as, for example, a file name. When data is stored in the data storage (140), an entry of a namespace may be generated that specifies the blocks of the address space (130) used to store the data and an identifier of the data. The data may be retrieved from the data storage by obtaining the blocks specified by the entry of the namespace that includes the identifier of the data. In other words, each entry of each namespace may include information that enables the computing device (100) to access the blocks that include portions of data associated with an identifier of the respective entry. For additional details regarding the namespace(s), See FIG. 1C.

The data storage (140) may store data. The data storage (140) may include a number of blocks specified by the address space (130). The data storage (140) may store data generated by the computing device (100A) or another computing device via the shared pool. As discussed above, each computing device may share a portion of its storage resources with other computing devices. Thus, the shared portion of its storage resources may store data from a different computing device. For additional details regarding the data storage (140), See FIG. 1E.

The storage manager (150) may manage storage/reading of data and manage storage resources. More specifically, the storage manager (150) may: (i) select a data storage, e.g., local or remote, for storing of data, (ii) facilitate reading of previously stored data from a local or remote storage, (iii) migrate data between local and remote storages, (iv) increase or decrease the quantity of local storage shared with other computing devices, (v) lock or unlock access to shared blocks of storage, (vi) update address spaces when data is moved between local and remote storages, and (vii) monitor the storage devices of the persistent storage and update the address space entries based on the health/availability of the storage devices of the persistent storage. To provide the aforementioned functionality, the storage manager (150) may generate, modify, or delete entries of the namespace(s) (120) and address space (130) while storing/modifying/reading data in the data storage (140). In one or more embodiments of the invention, the storage manager (150) may perform the methods illustrated in FIGS. 3A-5. The storage manager (150) may perform addition, fewer, or different functions without departing from the invention.

In one or more embodiments of the invention, the storage manager (150) may be implemented as a circuit. For example, the storage manager (150) may be implemented as a field programmable gate array, application integrated circuit, digital signal processor, or analog circuit. The storage manager (150) may be implemented as other types of circuit without departing from the invention.

In one or more embodiments of the invention, the storage manager (150) may be implemented as computer readable instructions stored on a non-transitory computer readable storage medium being executed by a processor. The computer readable instructions may cause the processor to perform the aforementioned functions of the storage manager (150).

As discussed above, the storage manager (150) may modify/read entries of the namespace(s) (120) and address space (130) when storing/reading data from a data storage, local or remote. To further clarify the operation of the storage manager (150), FIGS. 1C and 1D show diagrams of an example namespace and address space, respectively.

Figure 1C:
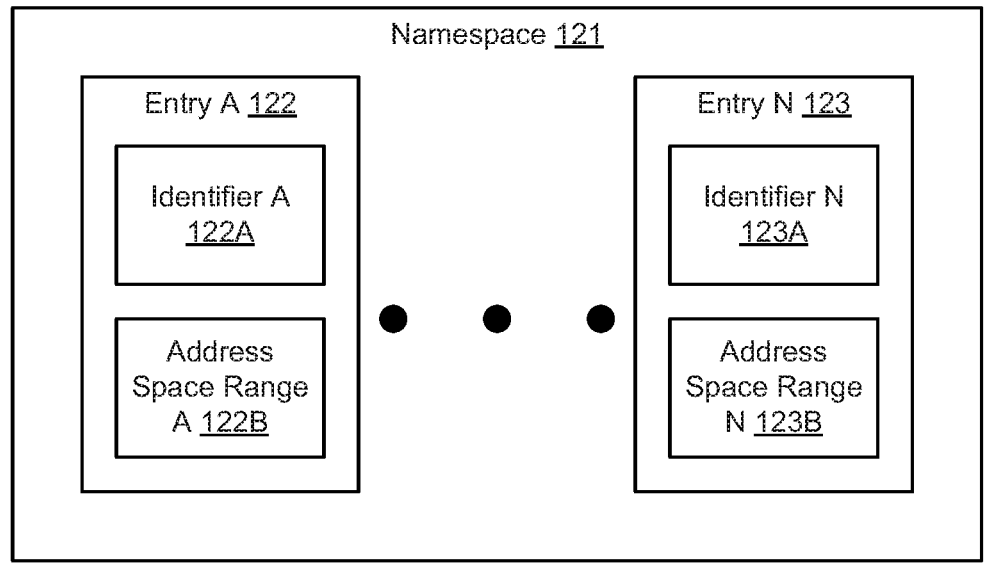
FIG. 1C shows a diagram of a namespace in accordance with one or more embodiments of the invention.

FIG. 1C shows a diagram of an example namespace (121) of the namespace(s) (120, FIG. 1B) in accordance with one or more embodiments of the invention. As discussed above, the namespace(s) (120, FIG. 1B) may be data structures including entries (122, 123). Each entry may include an identifier (122A, 123A) and an address space range (122B, 123B). The identifier may be, for example, a file name or a unique identifier. The address space range may specify one or more logical address identifiers of entries of an address space. Thus, an identifier of an entry may be associated with multiple blocks. Each of the blocks may store a portion of a file or other data structure. In one or more embodiments of the invention, the namespace(s) (120, FIG. 1B) may be implemented as part of a file system or an object storage.

Figure 1D:
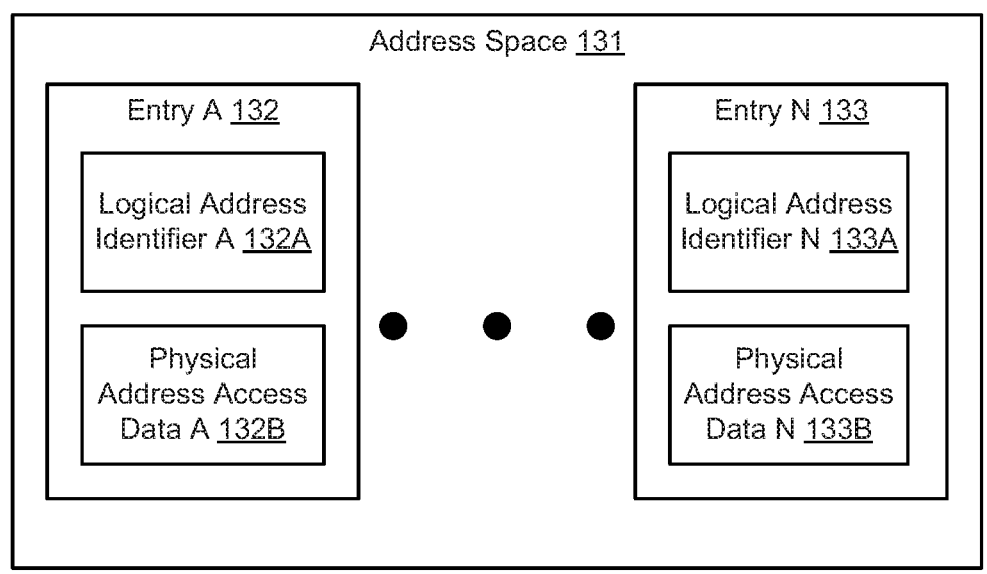
FIG. 1D shows a diagram of an address space in accordance with one or more embodiments of the invention.

FIG. 1D shows a diagram of an example address space (131) in accordance with one or more embodiments of the invention. As discussed above, the example address space (131) may be a data structure including entries (132, 133). Each entry may include a logical address identifier (132A, 133A) and physical address access data (132B, 133B). The logical address identifier may uniquely identify the entry of the example address space (131).

The physical address access data includes information that enables a block hosted by a local storage or by a remote storage to be accessed. Depending on where the block is hosted, the physical address access data may be different. In other words, entries of the address space include different types of data based on where the block is hosted. To further clarify the physical address access data, example of the physical address access data are shown in FIGS. 1E and 1F.

Figure 1E:
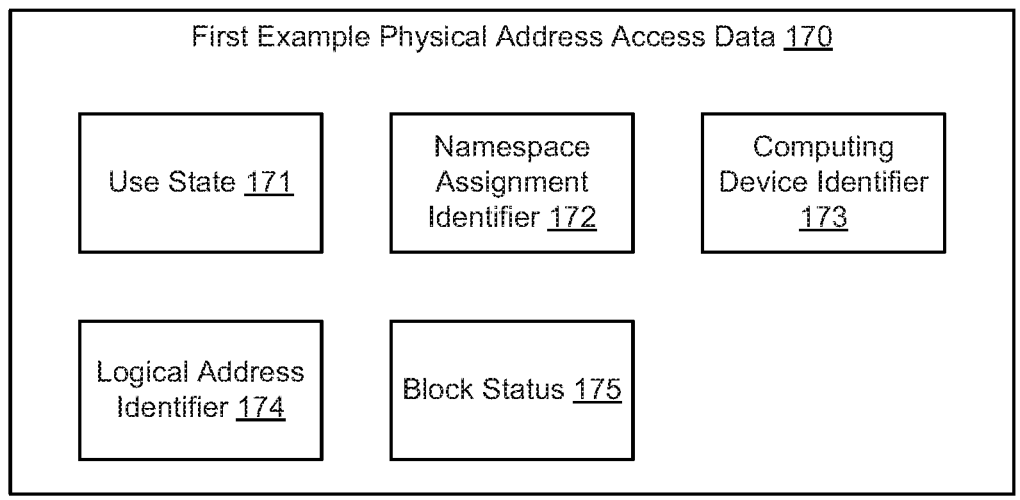
FIG. 1E shows a diagram of a first example physical address access data in accordance with one or more embodiments of the invention.

FIG. 1E shows a diagram of a first example physical address access data (170) in accordance with one or more embodiments of the invention. The first example physical address access data (170) is associated with a block hosted by a remote storage. In other words, the first example physical address access data (170) is associated with an entry of the address space that provides access to a block of the shared pool of blocks. The first example physical address access data (170) includes a use state (171) that specifies whether the associated block is in use, a namespace assignment identifier (172) that specifies a namespace utilizing the block as part of an entry, a computing device identifier (173) that specifies an identifier of a computing device that includes a persistent storage hosing the associated block, a logical address identifier (174) that specifies an entry of an address space hosted by the computing address identified by the computing device identifier (173), and a block status (175) that indicates an accessibility of the associated block.

In one or more embodiments of the invention, the first example physical address access data (170) does not specify the associated block directly. Rather, the first example physical address access data (170) indicates the associated block by specifying an address space entry of another computing device hosting the associated block.

Figure 1F:
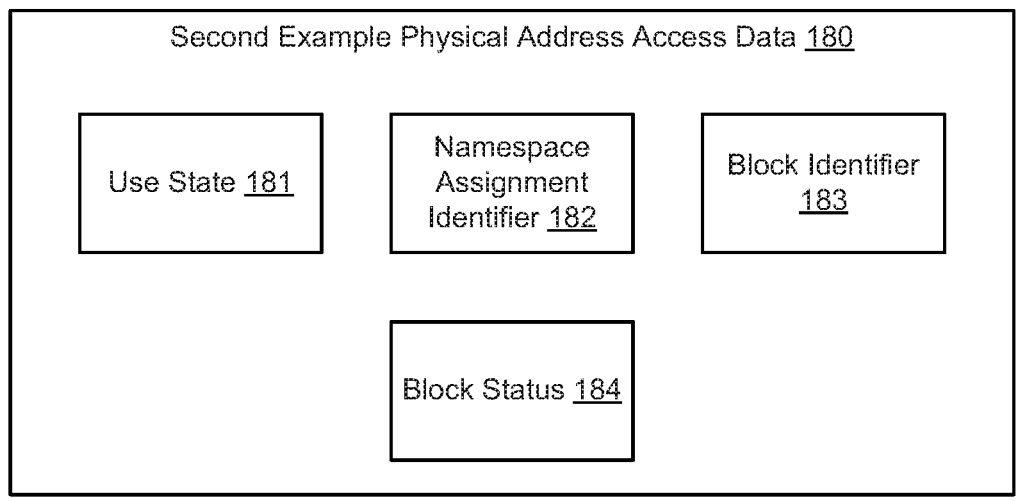
FIG. 1F shows a diagram of a second example physical address access data in accordance with one or more embodiments of the invention.

FIG. 1F shows a diagram of a second example physical address access data (180) in accordance with one or more embodiments of the invention. The second example physical address access data (180) is associated with a block hosted by a local storage, i.e., host by a persistent storage of the computing device on which the address space specifying the second example physical address access data (180) is hosted. In other words, the second example physical address access data (180) is associated with an entry of the address space that provides access to a block that is not shared with other computing devices. The second example physical address access data (180) includes a use state (181) that specifies whether the associated block is in use, a namespace assignment identifier (182) that specifies a namespace utilizing the block as part of an entry, a block identifier (183) that specifies an identifier of a block, and a block status (184) that indicates an accessibility of the associated block.

In one or more embodiments of the invention, the second example physical address access data (180) specifies the associated block directly. The second example physical address access data (180) may include an identifier or other information that enables the associated block to be accessed.

Figure 1G:
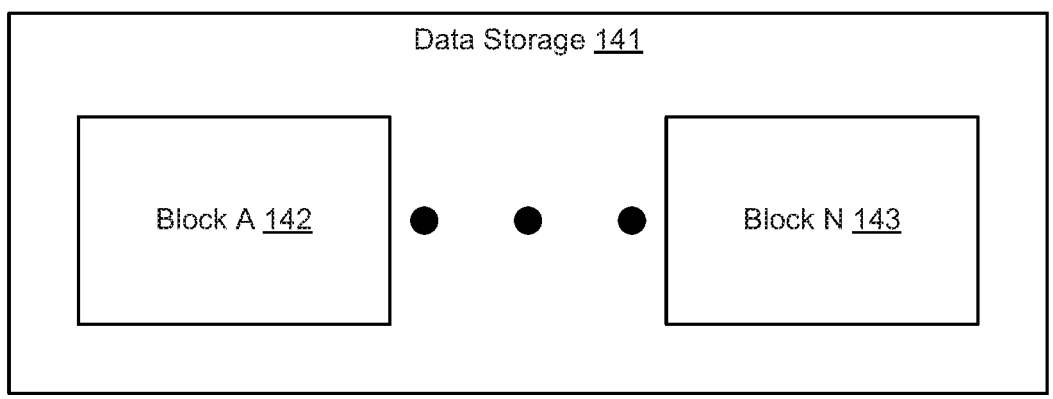
FIG. 1G shows a diagram of a data storage in accordance with one or more embodiments of the invention.

As discussed above, physical address access data may provide access to blocks of a data storage. FIG. 1G shows an example of a data storage (140) in accordance with one or more embodiments of the invention. The example data storage (141) includes any number of blocks (142, 143). The blocks may be accessed using information included in the address space.

Figure 2:
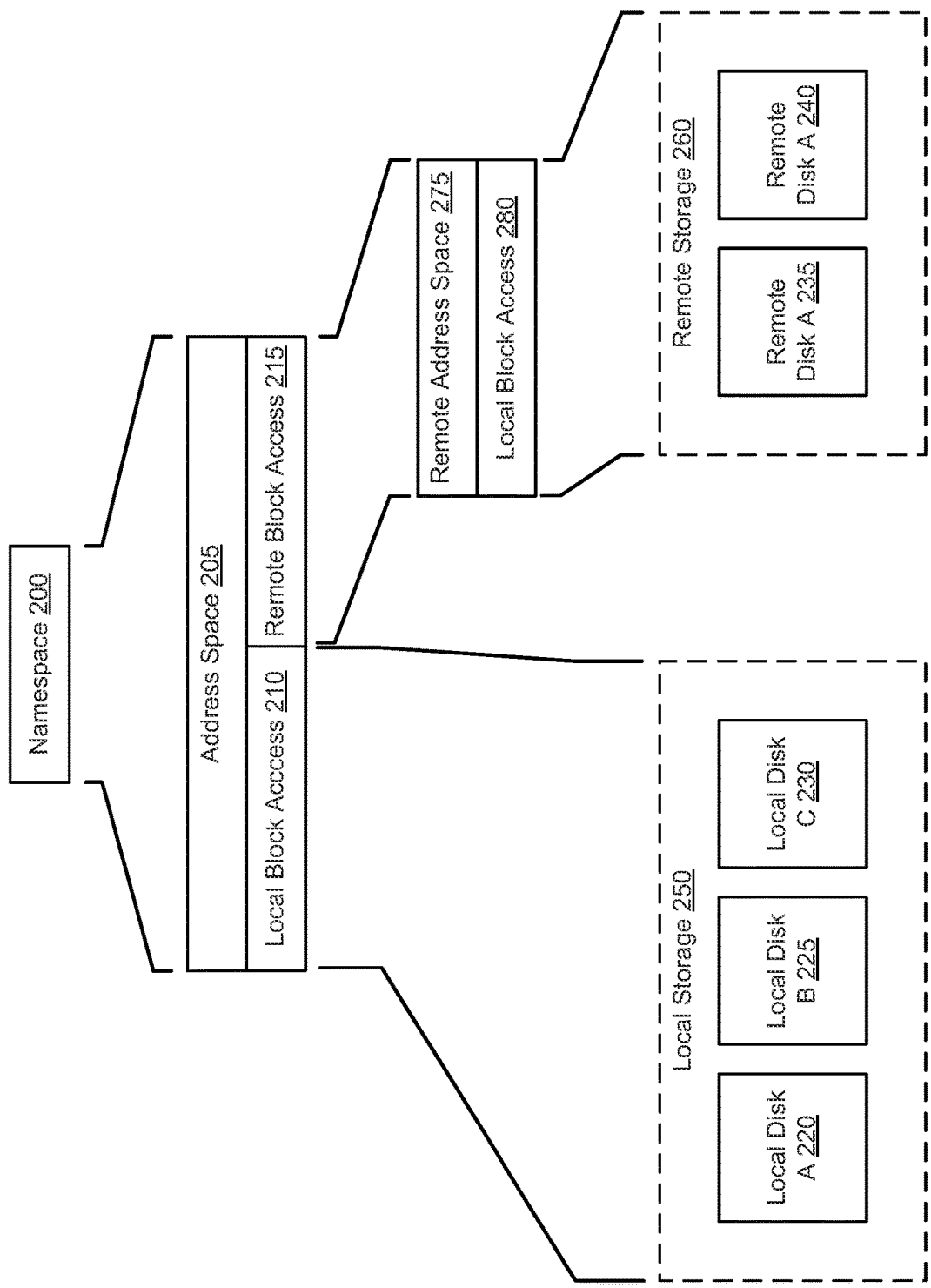
FIG. 2 shows a diagram illustrating relationships between namespaces, address spaces, and local/remote storages in accordance with one or more embodiments of the invention.

To further clarify the operation of the computing devices (100, FIG. 1A), FIG. 2 shows a diagram illustrating the flow between a namespace (200), an address space (205), local storage (250), and remote storage (260). When a data access request is made, the data access request includes an identifier. Using the identifier, the computing device identifies an entry of the namespace (200). The entry of the namespace (200) includes one or more logical address identifiers that identify entries of the address space (205).

As previously discussed, each entry of the address space (205) includes information that enables a corresponding block to be accessed. The corresponding block may be stored on a remote storage (260), i.e., a remote block, or may be stored on a local storage (250), i.e., a local block. Thus, entries of address space (205) may be classified into entries that provide local block access (210) or remote block access (215).

Entries that provide local block access (210) may include information that allows the blocks to be directly accessed, e.g., an identifier of the block. In contrast, entries that provide remote block access (215) include information that allows the block to be indirectly accessed. The information may be, for example, a logical address identifier of a remote address space (275) of a computing device hosting the remote block. The logical address identifier of the remote address space (275) may include information that allows the block to be locally accessed from the computing device hosting the remote block, e.g., an identifier of a block hosted by the computing device.

While the remote block access (215) entries of the address space (205) shown in FIG. 2 are illustrated as only providing access to a single remote storage hosted by a single computing device, the remote block access (215) entries of the address space (205) may provide access to any number of remote storages hosted by any number of computing devices without departing from the invention. For example, the address space (205) may include 20 local block access (210) entries, 10 remote block access (215) entries that provide access to a remote storage of a first computing device, 15 remote block access (215) entries that provide access to a second remote storage of a second computing device, 9 remote block access (215) entries that provide access to a third remote storage of a third computing device, etc. In one or more embodiments of the invention, the entries of the address space (205) that provide access to remote blocks may be referred to, in aggregate as a shadow address space. In one or more embodiments of the invention, the remote blocks of remote storages to which the shadow address space provides access information may be referred to, in aggregate as a shared pool.

As used herein, a remote storage refers a storage that is accessible by a first computing device but hosted by a second computing device. As used herein, a local storage refers to a storage of a computing device is accessible by the first computing device and hosted by the first computing device. As used herein, a remote block refers to a block hosted by a remote storage. As used herein, a local block refers to a block hosted by a local storage.

Additionally, while not illustrated in FIG. 2, in one or more embodiments of the invention, each computing device of the computing devices (100, FIG. 1A) may include the same shadow address space. In other words, each of the address spaces of the computing devices may include the same shadow address space.

As discussed above, each of the computing devices (100, FIG. 1A) may store data in the shared pool, read data from the shared pool, and migrate data to/from the shared pool. FIGS. 3A-5 show flow charts of methods performed by the computing devices (100, FIG. 1A) to provide the aforementioned functionality. The methods shown in FIGS. 3A-5 may be performed to provide additional, different, or reduced functionality without departing from the invention.

Figure 3A:
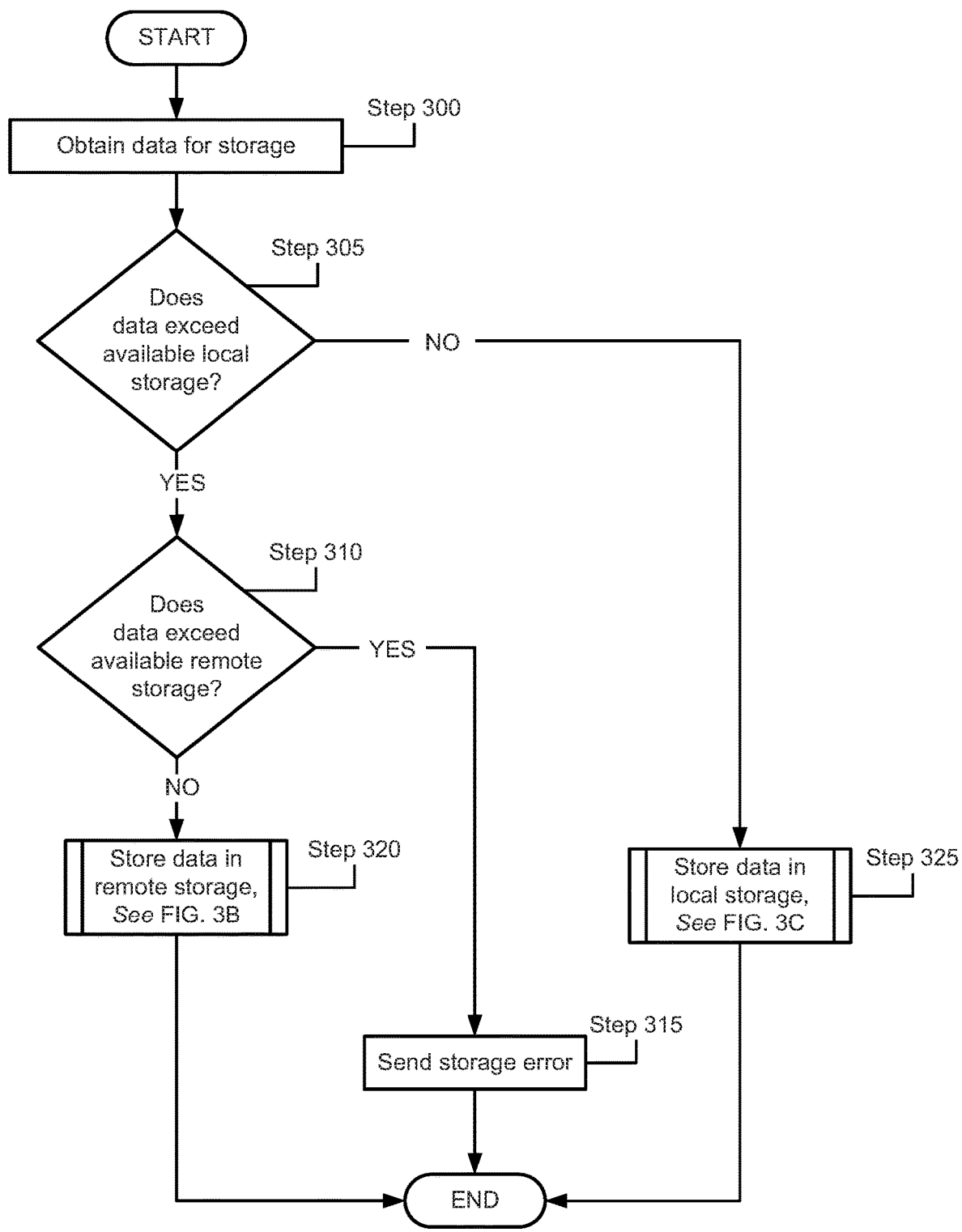
FIG. 3A shows a flowchart of a method of storing data in accordance with one or more embodiments of the invention.

FIG. 3A shows a flowchart of a method in accordance with one or more embodiments of the invention. The method depicted in FIG. 3A may be used to store data in accordance with one or more embodiments of the invention. The method shown in FIG. 3A may be performed by, for example, a storage manager (150, FIG. 1B) of a computing device. Other component of a computing device may perform the method illustrated in FIG. 3A without departing from the invention.

In Step 300, data for storage is obtained. The data may be obtained from an application executing on a computing device. The data may be received from another computing device. The data may be obtained via other methods without departing from the invention.

In Step 305, it is determined whether the data exceeds the capacity of available local storage. As discussed above, each entry of the address space may be classified as providing access to remote blocks or local blocks as well as include availability information of the aforementioned blocks. The size of the data may be compared to the aggregate storage capacity of the available local blocks to determine whether the data exceeds the capacity of the available local storage. If the data exceeds the capacity of available local storage, the method proceeds to Step 310. If the data does not exceed the capacity of available local storage, the method proceeds to Step 325.

In Step 310, it is determined whether the data exceeds the capacity of available remote storage. As discussed above, each entry of the address space may be classified as providing access to remote blocks or local blocks as well as include availability information of the aforementioned blocks. The size of the data may be compared to the aggregate storage capacity of the available remote blocks to determine whether the data exceeds the capacity of the available remote storage. If the data exceeds the capacity of the available remote storage, the method proceeds to Step 315. If the data does not exceed the capacity of the available remote storage, the method proceeds to Step 320.

In Step 315, an error message is returned. The error message may indicate that there is insufficient storage space to store the data. The method may end following Step 315.

Returning to Step 320, the data is stored in the remote storage. The data may be stored in the remote storage via the method illustrated in FIG. 3B. The data may be stored in the remote storage via other methods without departing from the invention. The method may end following Step 320.

Returning to Step 325, the data is stored in the local storage. The data may be stored in the local storage via the method illustrated in FIG. 3C. The data may be stored in the local storage via other methods without departing from the invention. The method may end following Step 325.

Figure 3B:
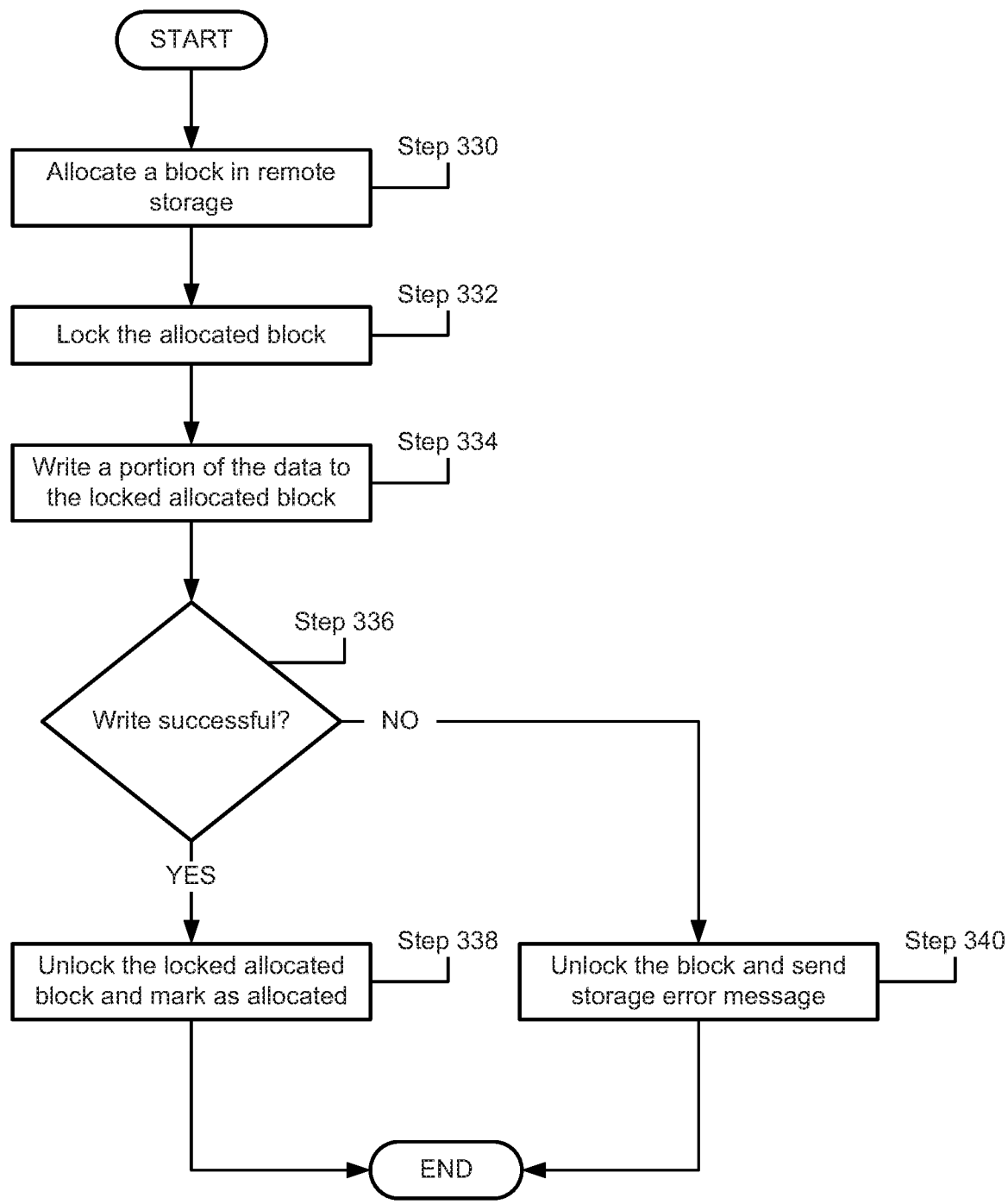
FIG. 3B shows a flowchart of a method of storing data in a remote storage in accordance with one or more embodiments of the invention.
Figure 3C:
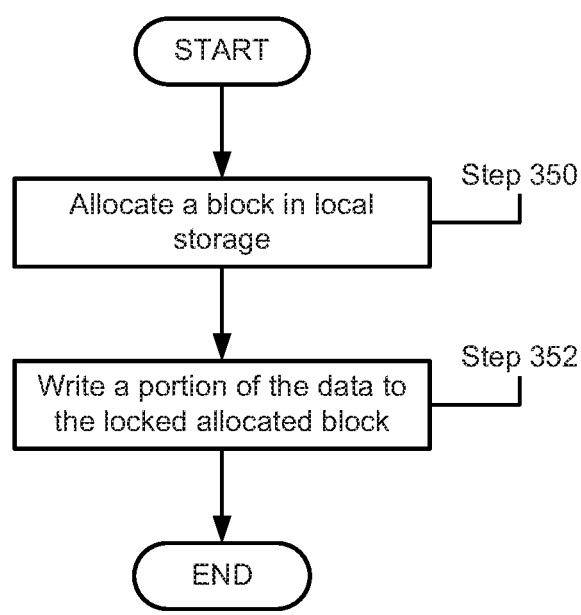
FIG. 3C shows a flowchart of a method of storing data in a local storage in accordance with one or more embodiments of the invention.

As discussed above with respect to FIG. 3A, data may be stored in local or remote storages using different methods. FIGS. 3B and 3C illustrate methods of storing data in remote storages and local storages, respectively.

FIG. 3B shows a flowchart of a method in accordance with one or more embodiments of the invention. The method depicted in FIG. 3B may be used to store data in a remote storage in accordance with one or more embodiments of the invention. The method shown in FIG. 3B may be performed by, for example, a storage manager (150, FIG. 1B) of a computing device. Other component of a computing device may perform the method illustrated in FIG. 3B without departing from the invention.

In Step 330, a block in a remote storage is allocated to store a portion of the data. The block may be allocated by sending a message to a computing device hosting the block. The message may request allocation of the block. Allocating the block may change a use state (181, FIG. 1E) of the block to indicate that the block is in use.

In Step 332, the allocated block is locked. The block may be locked by indicating to each of the computing devices that the block has been allocated. The locking of the allocated block may be indicated to each computing device by modifying the shadow address space of each computing device to indicate that the block has been allocated. Specifically, the use state (171, FIG. 1E) of the address space entry of each computing device corresponding to the allocated block may be changed to indicate that the block is in use. In one or more embodiments of the invention, each block may have a corresponding lock state separate from the characteristics illustrated in FIG. 1E. In such a scenario, the lock state of the block, rather than the use state, may be set to indicate that the block is in use, i.e., locked.

In Step 334, the portion of the data is written to the locked allocated block. The data may be written by sending a message to the computing device hosting the locked allocated block. The message may include the portion of the data.

In Step 336, it is determined whether the write was successful. In some cases, the write may not be successful due to downtime of a computing device, network communication errors, or other events. The success of the write may be determined by querying the computing device hosting the remote block after the write attempt in Step 334 is performed. If the write is successful, the method proceeds to Step 338. If the write is not successful, the write proceeds to Step 340.

In Step 338, the remote block including the portion of the data is unlocked and marked as allocated. The remote block may be marked as allocated by setting a use state (171, FIG. 1E) of the remote block to indicate that the block is allocated. The method may end following Step 338.

In Step 340, the remote block allocated in Step 330 is unlocked and a storage error message is returned. The storage error message may indicate that the portion of the data was not written to the remote block allocated in Step 330. In one or more embodiments of the invention, the remote block may be marked as not allocated in Step 340. The method may end following Step 340.

FIG. 3C shows a flowchart of a method in accordance with one or more embodiments of the invention. The method depicted in FIG. 3C may be used to store data in a local storage in accordance with one or more embodiments of the invention. The method shown in FIG. 3C may be performed by, for example, a storage manager (150, FIG. 1B) of a computing device. Other component of a computing device may perform the method illustrated in FIG. 3C without departing from the invention.

In Step 350, a local block in a local storage is allocated to store a portion of the data.

In Step 352, the portion of the data is written to the allocated local block. The method may end following Step 352.

Figure 4A:
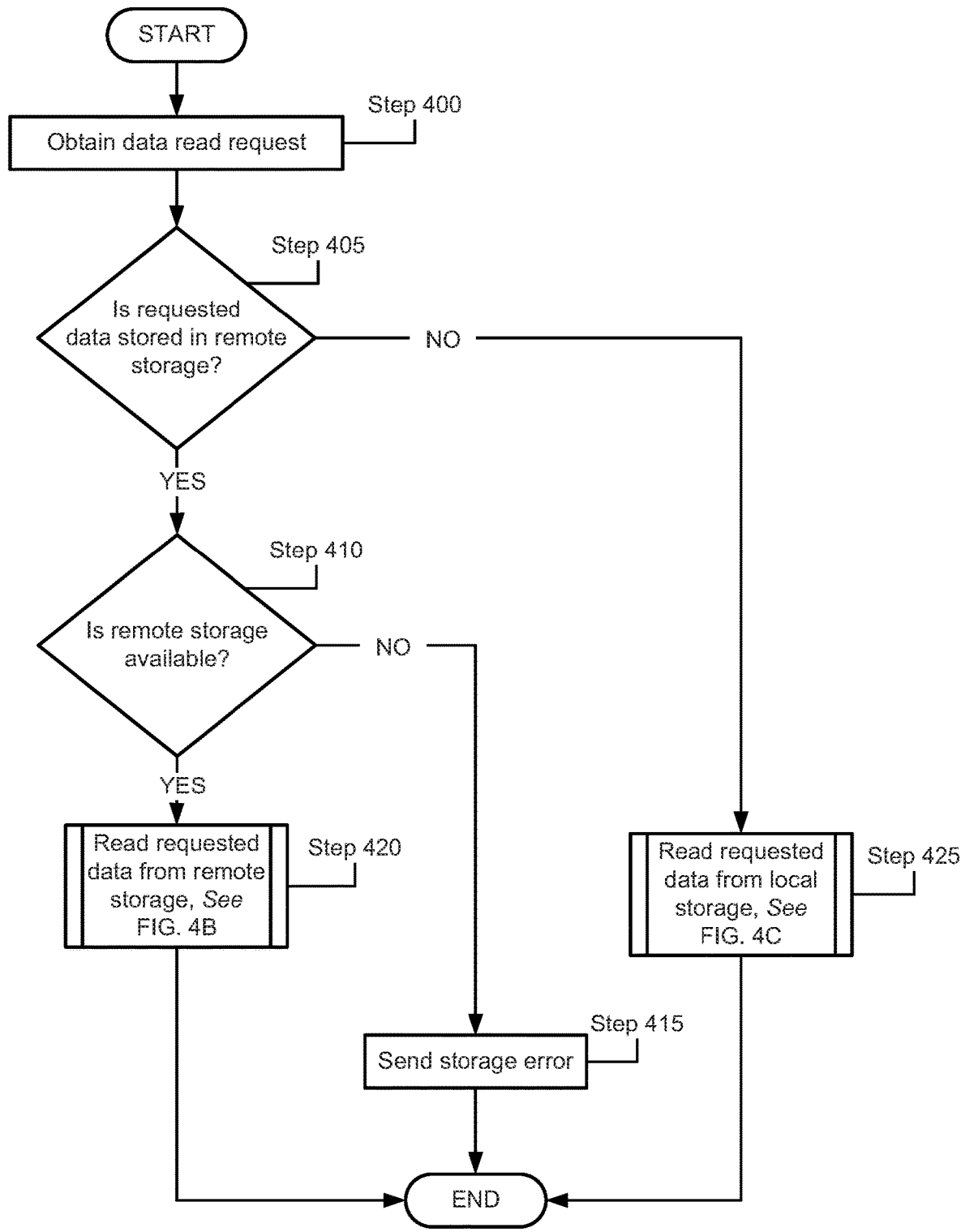
FIG. 4A shows a flowchart of a method of reading data in accordance with one or more embodiments of the invention.
Figure 4B:
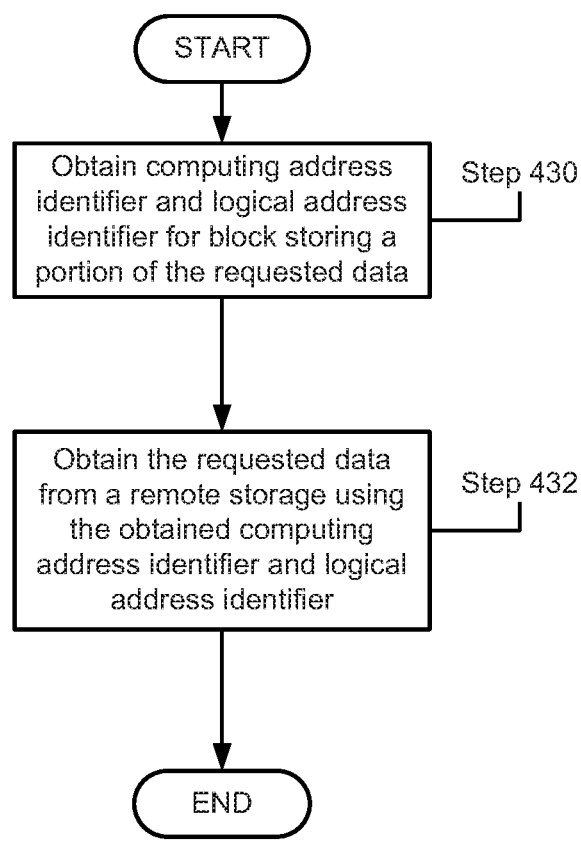
FIG. 4B shows a flowchart of a method of reading data from a remote storage in accordance with one or more embodiments of the invention.
Figure 4C:
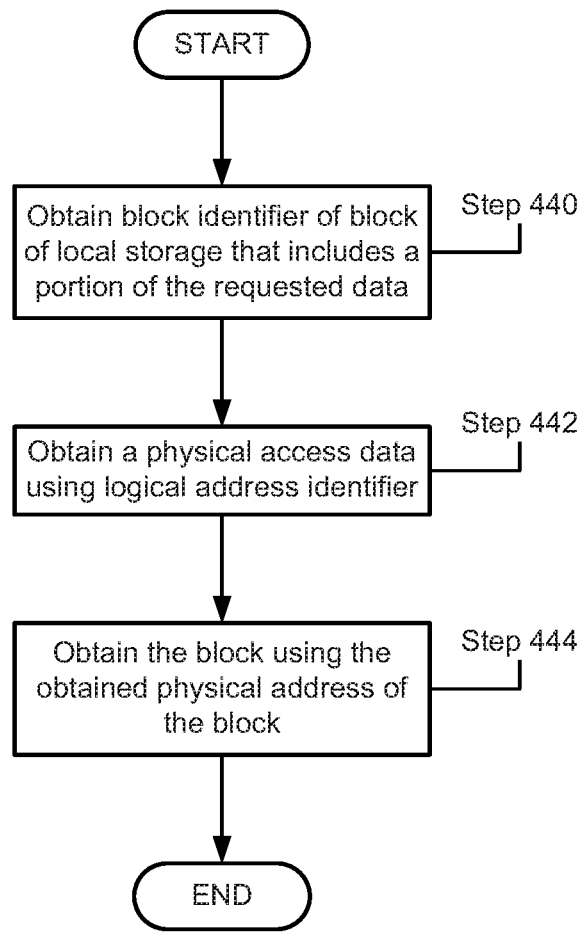
FIG. 4C shows a flowchart of a method of reading data from a local storage in accordance with one or more embodiments of the invention.

After data is stored in a local or remote storage, a computing device may wish to read that data from the local or remote storage. FIGS. 4A-4C illustrate methods that may be used to read data from a local or remote storage.

FIG. 4A shows a flowchart of a method in accordance with one or more embodiments of the invention. The method depicted in FIG. 4A may be used to read data stored by a computing device in accordance with one or more embodiments of the invention. The method shown in FIG. 4A may be performed by, for example, a storage manager (150, FIG. 1B) of a computing device. Other component of a computing device may perform the method illustrated in FIG. 4A without departing from the invention.

In Step 400, a data read request is obtained. The data read request may include an identifier of the data requested by the data read request.

In Step 405, it is determined whether the requested data is stored in a remote storage. The location of the requested data may be determined based on the blocks used to store the data. As discussed above, entries of the address space may be classified as either proving local block access or remote block access. The blocks used to store the data may be identified using: (i) the identifier of the requested data in the data read request and (ii) a namespace. The identifier may be matched to an entry of the names space. The entry may include identifiers corresponding to entries of the address space.

If the is stored in a remote storage, the method proceeds to Step 410. If the data is not stored in a remote storage, the method proceeds to Step 425.

In Step 410, it is determined whether the remote storage storing the requested data is available. The availability of the remote storage may be determined by querying the computing device hosting the remote storage. As used here, the availability of the remote storage refers to whether the remote storage is accessible to the computing device that includes the address space used to identify the remote storage hosting the data.

If the remote storage is available, the method proceeds to Step 420. If the remote storage is not available, the method proceeds to Step 415.

In Step 420, the requested data is read from the remote storage. The requested data may be read from the remote storage using the method illustrated in FIG. 4B. The requested data may be read from the remote storage using other methods without departing from the invention. The method may end following Step 420.

Returning to Step 415, a storage error message is sent to the entity requesting the data. The method may end following Step 415.

Returning to Step 425, the requested data is read from the local storage. The requested data may be read from the local storage using the method illustrated in FIG. 4C. The requested data may be read from the local storage using other methods without departing from the invention.

The method may end following Step 425.

FIG. 4B shows a flowchart of a method in accordance with one or more embodiments of the invention. The method depicted in FIG. 4B may be used to read data from a remote storage in accordance with one or more embodiments of the invention. The method shown in FIG. 4B may be performed by, for example, a storage manager (150, FIG. 1B) of a computing device. Other component of a computing device may perform the method illustrated in FIG. 4B without departing from the invention.

In Step 430, a computing device identifier and a logical address identifier for a block storing a portion of the requested data is obtained. The computing device identifier and the logical address identifier may be obtained from an address space entry having an identifier specified by an entry of a namespace having an identifier of the identifier provided in the data access request obtained in Step 400 of FIG. 4A.

In Step 432, the portion of the requested data is obtained using the obtained computing address identifier and logical address identifier. The portion of the requested data may be obtained by sending a message to the computing device specified by the obtained computing address identifier. The message may include the obtained logical address identifier. The computing device that receives the logical address identifier may return the data stored in the block specified by the address space of the computing device. In other words, the computing device may identify an entry of its address space having the logical address identifier, identify a block stored in a local storage specified by the identified entry, and return the data stored in the identifier block of the local storage.

Steps 430 and 432 may be repeated for each entry of the address space specified by the entry of the namespace matching the identifier included in the data access request obtained in Step 400 of FIG. 4A.

The method may end following Step 432.

FIG. 4C shows a flowchart of a method in accordance with one or more embodiments of the invention. The method depicted in FIG. 4C may be used to read data from a local storage in accordance with one or more embodiments of the invention. The method shown in FIG. 4C may be performed by, for example, a storage manager (150, FIG. 1B) of a computing device. Other component of a computing device may perform the method illustrated in FIG. 4C without departing from the invention.

In Step 440, a logical address identifier of a block of a local storage that includes a portion of the requested data is obtained. The logical address identifier may be obtained from an address space entry having an identifier specified by an entry of a namespace having an identifier of the identifier provided in the data access request obtained in Step 400 of FIG. 4A.

In Step 442, physical access data is obtained using the logical address identifier. The logical address identifier may be used to identify an entry of the address space. The address space may include the physical access data.

In Step 444, the block is obtained using the obtained physical access data. The block may be obtained by reading the block using the obtained physical access data.

The method may end following Step 444.

Figure 5:
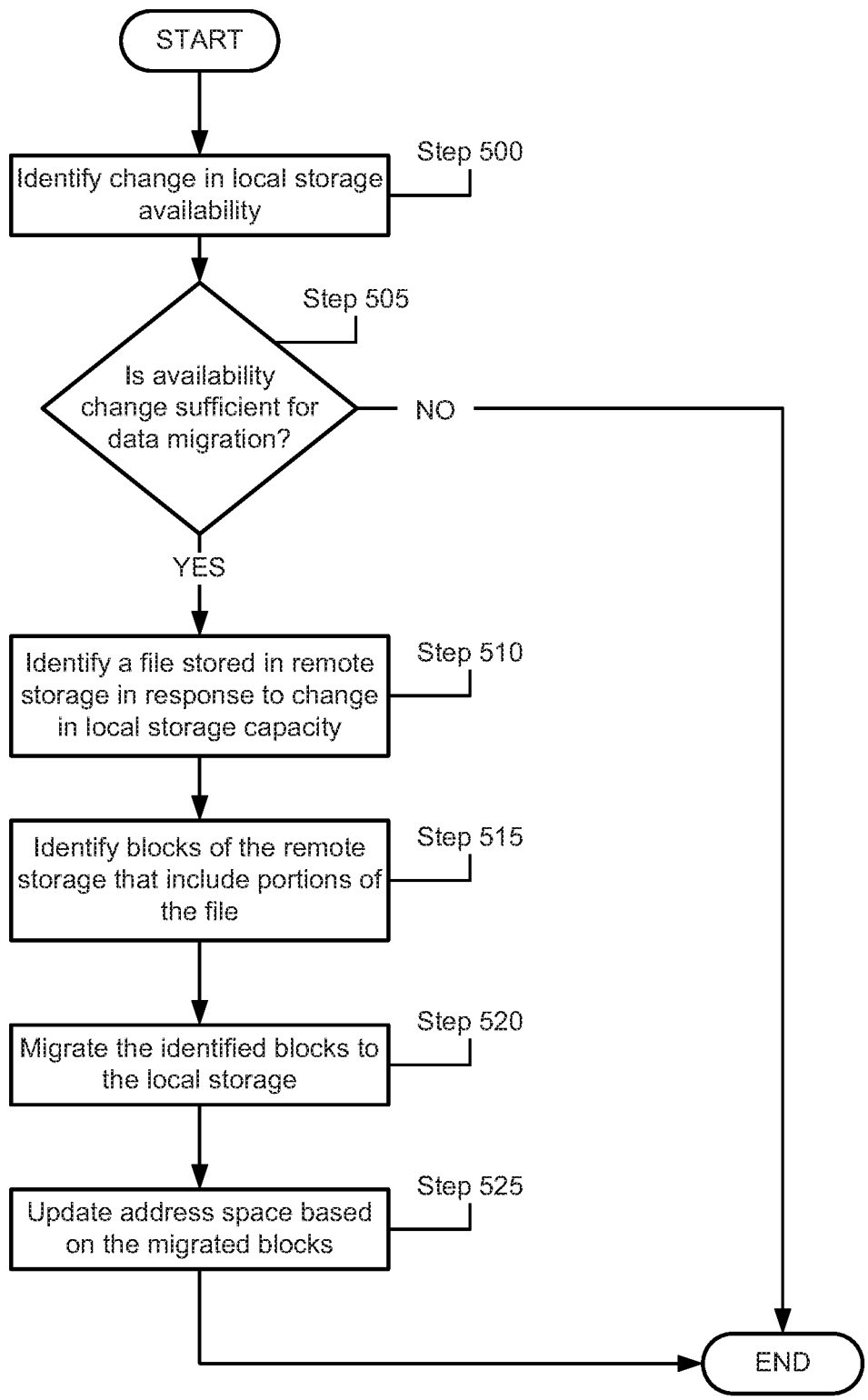
FIG. 5 shows a flowchart of a method of migrating data in accordance with one or more embodiments of the invention.

In addition to storing data and reading data, the computing devices may migrate stored data between remote storages and local storage. FIG. 5 shows a method that may be performed by a computing device to provide the aforementioned functionality. The computing device may migrate data between remote storage and local storage using other methods without departing from the invention.

FIG. 5 shows a flowchart of a method in accordance with one or more embodiments of the invention. The method depicted in FIG. 5 may be used to migrate data between remote storages and local storages in accordance with one or more embodiments of the invention. The method shown in FIG. 5 may be performed by, for example, a storage manager (150, FIG. 1B) of a computing device. Other component of a computing device may perform the method illustrated in FIG. 5 without departing from the invention.

In Step 500, a change in local storage availability is identified. The change may be an increase in the quantity of available local storage. In one or more embodiments of the invention, the change may be an increase by a predetermined amount of storage. The predetermined amount may be, for example, 10% of the storage capacity of the local storage.

In Step 505, it is determined whether the change in availability is sufficient for data migration. The sufficiency of the change may be determined by comparing the change to a quantity of data stored on a remote storage. If the change results in an increase in the amount of available storage of the local storage that exceeds the quantity of data stored on the remote storage, the change may be determined to be sufficient. The quantity of data may be, for example, the size of one or more files previously stored in one or more remote storages.

Change is sufficient, the method proceeds to Step 510. If the change is not sufficient, the method may end following Step 505.

In Step 510, a file stored in the mote storage is identified in response to the change in the availability of the local storage. The file may be, for example, a file of the data used to make the determination in Step 505.

In Step 515, blocks of a remote storage that include portions of the file are identified. The block may be identified using entries of the address space. As discussed above, the entries of the address space may include information that enables blocks of remote storages to be indirectly identified.

In Step 520, the identified blocks are migrated to the local storage. The identified blocks may be migrated by making copies of the identified blocks in blocks of the local storage. The identified block may be de-allocated.

In Step 525, the address space is updated based on the migrated blocks. In other words, the address space entries corresponding to the identified blocks may be updated to reflect the local blocks in which the copies of the identified blocks are stored. Additionally, all computing devices that share the identified blocks may also update their address spaces. The address spaces of all of the computing devices may be updated by sending messages by the computing device initiating the method illustrated in FIG. 5 to each other computing device that shares the identified blocks of Step 515 indicated that the blocks have been de-allocated/are available.

The method may end following Step 525.

One or more embodiments of the invention may be implemented using instructions executed by one or more processors of the computing devices. Further, such instructions may correspond to computer readable instructions that are stored on one or more non-transitory computer readable mediums.

One or more embodiments of the invention may facilitate the sharing of storage resources in a high performing computing environment. Due to the large number of computing devices in a high performance computing environment, network communications may limit storing data across storage resources hosted by multiple computing devices. For example, sharing of storage resources in a traditional environment requires exporting of file systems or logical unit identifiers to each of the computing devices sharing the computing resources to prevent multiple computing devices from attempting to access the shared computing resources. Embodiments of the invention may reduce the computing resources required to share storage resources across multiple computing devices. The embodiments of the invention may reduce the computing resources by utilizing an address space that organizes both local storage of the computing device and the shared storage resources. The aforementioned address space may eliminate the need to export file systems or logical unit identifiers to share storage resources. Embodiments of the invention may provide other advantages over conventional methods of sharing storage resources and/or provide other advantages or address other problems without departing from the invention.

Additionally, one or more embodiments of the invention may enable one or more of the following: i) sharing of storage space between computing devices without exporting a file system or logical unit identifiers, ii) reduced computing resources used for data storage/access by migrating the data, and iii) reduced computing resources used for migration of data between computing devices using a shared address space compared to migrating data between computing devices by exporting file systems or logical unit identifiers.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A computing device, comprising:
 a persistent storage comprising:
   a local storage comprising blocks, and
   an address space comprising:
     a first plurality of entries that specify the blocks of the local storage, and
     a second plurality of entries that indicate blocks of a remote storage; and
 a processor programmed to:
   obtain data for storage;
   make a first determination that the data cannot be stored in the local storage, wherein at a time the first determination is made there is not sufficient space to store the data in the local storage; and
   in response to the first determination, store the data in the remote storage using the second plurality of entries, wherein storing the data in the remote storage using the second plurality of entries comprises:
allocating a block of the remote storage indicated by an entry of the second plurality of entries, wherein the entry of the second plurality of entries comprises: a computing device identifier that identifies a second computing device that hosts the remote storage and a logical address identifier that specifies an entry of an address space of the second computing device;
locking the allocated block by updating a use state of the entry of the second plurality of entries to locked;
writing a portion of the data to the locked allocated block;
unlocking the locked allocated block after writing the portion of the data by updating the use state of the entry of the second plurality of entries to unlocked;
after the unlocking,
make a second determination that there is available space in the local storage;
in response to the second determination, identify a block of the remote storage that includes the portion of the data; and
migrate the identified block from the remote storage to the local storage.

2. The computing device of claim 1, wherein each entry of the second plurality of entries does not specify a block of the remote storage.

3. The computing device of claim 1, wherein the entry of the address space of the second computing device specifies a block of the blocks of the remote storage.

4. The computing device of claim 1, wherein the entry of the second plurality of entries further comprises:
a block status.

5. The computing device of claim 4, wherein the block status specifies a state of the remote storage hosting a block specified by the entry of the second plurality of entries is available.

6. The computing device of claim 1, wherein the use state specifies whether a block specified by the entry of the second plurality of entries is available.

7. The computing device of claim 1, wherein the processor is further programmed to:
obtain second data for storage;
make a third determination that the second data can be stored in the local storage; and
in response to the third determination, store the second data in the local storage using the first plurality of entries.

8. The computing device of claim 7, wherein each entry of the first plurality of entries specifies a block identifier associated with a respective block of the blocks of the local storage.

9. The computing device of claim 1, wherein migrating the identified block from the remote storage to the local storage comprises:
obtaining a copy of identified block from the remote storage;
storing the copy of the identified block in a block of the local storage;
deleting the identified block from the remote storage; and
updating the address space based on the copy and the deletion.

10. The computing device of claim 9, wherein updating the address space based on the copy and the deletion comprises:
deleting a computing device identifier and a logical address identifier associated with a second entry of the second plurality of entries that specifies the identified block; and
adding a block identifier that specifies the block of the local storage.

11. The computing device of claim 1, wherein each block of the plurality of blocks of the local storage comprises a predetermined number of bytes.

12. A method of operating a computing device, comprising:
obtaining, by the computing device, data for storage;
making, by the computing device, a first determination that the data cannot be stored in a local storage comprising blocks, wherein the blocks of the local storage are specified by a first plurality of entries of an address space of the computing device and wherein at a time the first determination is made there is not sufficient space to store the data in the local storage; and
in response to the first determination, storing, by the computing device, the data in a remote storage using a second plurality of entries that indicate blocks of the remote storage, wherein storing the data in the remote storage using the second plurality of entries comprises:
allocating a block of the remote storage indicated by an entry of the second plurality of entries, wherein the entry of the second plurality of entries comprises: a computing device identifier that identifies a second computing device that hosts the remote storage and a logical address identifier that specifies an entry of an address space of the second computing device;
locking the allocated block by updating a use state of the entry of the second plurality of entries to locked;
writing a portion of the data to the locked allocated block;
unlocking the locked allocated block after writing the portion of the data by updating the use state of the entry of the second plurality of entries to unlocked;
after the unlocking,
making a second determination that there is available space in the local storage;
in response to the second determination, identifying a block of the remote storage that includes the portion of the data; and
migrating the identified block from the remote storage to the local storage.

13. The method of claim 12, further comprising:
obtaining, by the computing device, second data for storage;
making a third determination, by the computing device, that the second data can be stored in the local storage; and
in response to the third determination, storing, by the second computing device, the second data in the local storage using the first plurality of entries.

14. A non-transitory computer readable medium comprising computer readable program code, which when executed by a computer processor enables the computer processor to perform a method for operating a computing device, the method comprising:
obtaining, by the computing device, data for storage;
making, by the computing device, a first determination that the data cannot be stored in a local storage comprising blocks, wherein the blocks of the local storage are specified by a first plurality of entries of an address space of the computing device and, wherein at a time the first determination is made there is not sufficient space to store the data in the local storage; and in response to the first determination, storing, by the computing device, the data in a remote storage using a second plurality of entries that indicate blocks of the remote storage, wherein storing the data in the remote storage using the second plurality of entries comprises:

allocating a block of the remote storage indicated by an entry of the second plurality of entries, wherein the entry of the second plurality of entries comprises a computing device identifier that identifies a second computing device that hosts the remote storage and a logical address identifier that specifies an entry of an address space of the second computing device;

locking the allocated block by updating a use state of the entry of the second plurality of entries to locked;

writing a portion of the data to the locked allocated block;

unlocking the locked allocated block after writing the portion of the data by updating the use state of the entry of the second plurality of entries to unlocked;

after the unlocking, make a second determination that there is available space in the local storage;

in response to the second determination, identify a block of the remote storage that includes the portion of the data; and migrate the identified block from the remote storage to the local storage.

15. The non-transitory computer readable medium comprising computer readable program code of claim 14, wherein the method further comprises:

obtaining, by the computing device, second data for storage;

making a second determination, by the computing device, that the second data can be stored in the local storage; and in response to the second determination, storing, by the second computing device, the second data in the local storage using the first plurality of entries.

* * * * *